Figure 1:
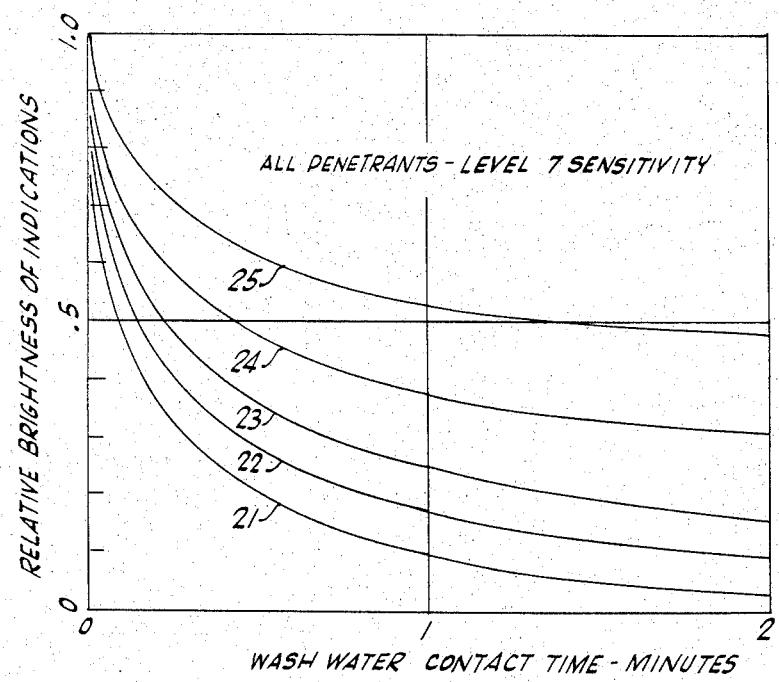

United States Patent [19]
Alburger

[11] 3,770,957
[45] Nov. 6, 1973

[54] METHOD AND MEANS OF SELECTIVE REMOVAL OF BACKGROUND INDICATIONS IN STABILIZED WATER-WASHABLE INSPECTION PENETRANT PROCESSES

[76] Inventor: James R. Alburger, 5007 Hillard Ave., La Canada, Calif. 91011

[22] Filed: Mar. 24, 1972

[21] Appl. No.: 237,765

[52] U.S. Cl. ............... 250/71 T, 73/104, 252/301.2
[51] Int. Cl. .......................................... G01n 21/16
[58] Field of Search ............... 250/71 T; 73/104; 252/301.2

[56] References Cited
UNITED STATES PATENTS

| | | | |
|---|---|---|---|
| 3,422,670 | 1/1969 | Alburger | 73/104 |
| 3,429,826 | 2/1969 | Alburger | 250/71 T |
| 2,806,959 | 9/1957 | DeForest et al. | 250/71 T |
| 3,456,110 | 7/1969 | Diperstein | 250/71 T |
| 3,558,882 | 1/1971 | Fijalkowski | 250/71 T |

Primary Examiner—Harold A. Dixon

[57] ABSTRACT

An improvement in the water-washable inspection penetrant process wherein a "stabilized" background-producing water-washable inspection penetrant is employed and the water-wash step is modified to include a brief spray-wash with water, application of an accelerator rinse of a low energy detergent solution, and a final water rinse, whereby background indications of shallow surface discontinuities are selectively removed to a controlled degree.

3 Claims, 2 Drawing Figures

METHOD AND MEANS OF SELECTIVE REMOVAL OF BACKGROUND INDICATIONS IN STABILIZED WATER-WASHABLE INSPECTION PENETRANT PROCESSES

RELATED PATENTS

U.S. Pat. No. 3,107,298, "Apparatus for the Measurement of Fluorescent Tracer Sensitivity."

U.S. Pat. No. 3,164,006, "Evaluation Performance of Liquid Penetrant Tracer Materials."

U.S. 282,843, No. 3,282,843, "Emulsifier Compositions."

U.S. Pat. No. 3,311,479, "Penetrant Inspection Process and Compositions."

U.S. Pat No. 3,349,041, "Gel-Forming Inspection Penetrant and Emulsifier Compositions and Processes."

U.S. Pat. No. 3,422,670, "Cleaning Process and Compositions for Post-Emulsifier Inspection Penetrants."

U.S. Pat. No. 3,429,826, "Gel-Forming Inspection Penetrant and Emulsifier Compositions Employing Hydrophylic and Lipophylic Surfactants."

U.S. Pat. No. 3,527,709, "Fluorescent Tracer Process and Compositions."

U.S. Pat. NO. 3,557,015, "Dual-Sensitivity Dyed Liquid Tracers."

U.S. Pat. No. Re. 26,888, "Process for Fluorescence Detection of Extremely Thin Tracer Films."

The inspection penetrant process is used extensively for the detection of potential failure flaws in machine parts, such as jet engine turbine blades, bearings, and the like. In Essence, the process involves the steps of applying an oily, dyed penetrant liquid to test parts, by dip, brush, or spray; cleaning off surface penetrant by emulsification and washing; and inspecting the test parts for traces of penetrant liquid which remain trapped in flaws open to the surface. In some cases, a developer, such as a fine, fluffy powder or a suspension of powder particles in a liquid, may be applied to test surfaces just prior to inspection, so as to draw entrapments of penetrant out of surface cracks, thereby enhancing the detectability of such flaw indications.

Modern inspection penetrants utilize fluorescent dyes of various kinds for the purpose of providing high sensitivity in the detection of surface flaws, and the inspection of parts thus tested is usually carried out in a semi-darkened booth, and under ultraviolet irradiation provided by a suitable black light lamp.

Two kinds of inspection penetrant processes are in vogue, one being known as the P/E or post-emulsifier process, the other being known as the W/W or water-washable process. In the P/E process, the penetrant is an oily, water-insoluble liquid containing a dissolved indicator dye (or dyes). After application of this oily liquid to test surfaces, the surfaces are drained and an emulsifier is applied, again by dipping, brush, or spray. The emulsifier acts to render surface pentrant emulsifiable in water so that it may be removed in a subsequent washing step. However, the emulsifier also penetrates, to a greater or lesser extent, into surface flaws and renders penetrant entrapped therein soluble (emulsifiable) in wash water.

Accordingly, the P/E process, as normally employed, suffers from the drawback that significant deterioration of flaw indications usually occurs even within a few seconds of emulsifier contact time. This is particularly true in the case of extremely shallow crack defects, porosity defects, and inter-granular corrosion defects.

It is possible to reduce the effect of emulsifier stripping of flaw entrapments in the P/E process by reducing the activity of the emulsifier, in accordance with the teachings of my U.S. Pat. No. 3,422,670, or by increasing the resistance of the penetrant to emulsification, in accordance with the teachings of my U.S. Pat. No. 3,311,479. However, in the former case, such low energy emulsifiers must be applied by spray, and this mode of usage is not always convenient or desirable. In the latter case, there is a limit to the ability of known liquid material compositions to resist emulsification and at the same time remain practical for usage as inspection penetrant vehicles.

Much of the military and commercial usage of penetrants is now concentrated on the W/W process, for the reason that water-washable penetrants are simple to use, requiring only the two basic steps of penetration and water-wash removal. Also, processing costs are minimized by the elimination of emulsifier inventories and equipment such as emulsifier dip tanks and related apparatus.

The W/W process also suffers from the inherent problem of leaching out of flaw indications during the step of wash-removal of surface penetrant. Wash water tends to diffuse into entrapments of penetrant in surface flaws, causing them to wash out to a greater or lesser extent, depending on the time duration of wash water contact with the test surface.

A very significant improvement in the ability of penetrant entrapments to remain in surface flaws during processing has been achieved by causing the penetrant liquid to form a viscous gel upon contact with water, as is taught in my U.S. Pat. Nos. 3,282,843, 3,349,041, and 3,429,826. It is even possible to provide an improved retention of flaw entrapments (or indications) simply by utilizing a penetrant liquid which has a relatively high viscosity. For example, many penetrant liquids have viscosity values (rated at 100° F.) on the order of 3 to 5 cst. Thus, a W/W penetrant vehicle having a viscosity which is high relative to 3 or 5 cst., as, for example, 15 to 50 cst., will exhibit a noticeable improvement in retention of indications during wash removal of penetrant. As already mentioned (supra), the use of a gel-forming W/W penetrant provides a very pronounced enhancement of indication retention, particularly if the penetrant liquid is designed in such a way that it passes through a gel-condition upon contact with wash water, providing a rise in viscosity of the penetrant/water mixture to a valye above 75 to 100 cst.

The degree of indication retention may be further stabilized by use of special sensitizer dyes, as is described and claimed in my copending application, Ser. No. 222011, filed Mar. 13, 1972, for "Method and Means of Enhancing and Controlling Retention of Flaw Indications in Water-Washable Inspection Penetrant Processes."

The ability of an inspection penetrant to reveal the presence of extremely small defects in surfaces depends in part on the dimensional threshold of fluorescence (or color) response in the indicator dye which is present in the penetrant, and this "dimensional sensitivity" characteristic may be conveniently evaluated by use of the so-called "Meniscus-Method" in accordance with the teachings of my U.S. Pat. No. 3,107,298. Thus, if surface flaws were to retain entrapments of penetrant throughout the entire penetrant process without any loss of leaching out, then the dimensional threshold of fluorescence or color would be a true index of the flaw-detecting capability or "sensitivity" of the penetrant. Since leaching out of indications always does occur in practice, the extent or degree of such leaching out must be taken into account in the determination of the flaw detection sensivitity of a W/W penetrant.

I have devised instrumentation and measurement techniques for accurately evaluating the indication retention capability of a given penetrant as a function of remover contact time, be the remover an emulsifier or wash water, and I have discovered a new and novel method and means of providing a very substantial improvement in the stability of W/W penetrant indications and their ability to resist wash removal, this method and means being described and claimed in my above-mentioned copending application, Ser. No. 222011. In fact, the improvement which may be effected in indication retention is so dramatic that my stabilizer method and means cannot normally be used to its fullest extent in accordance with conventional wash-removal techniques, since under such conditions a tremendous amount of fine surface-structure detail is revealed, and this tends to interfere with the detection and evaluation of potential failure defects in highly stressed parts. Thus, for most practical inspection application, where conventional washing techniques are utilized, it has been found desirable to employ only a partial stabilization of indication retention. Even at such conditions of partial stabilization, the use of high levels of sensitivity in the pentrants induces the formation of an excessive degree of background indications of fine surface porosity features.

In any event, W/W inspection penetrants may be stabilized by various means and to varying degrees of indication retention. In all cases, as the degree of stabilization increases, and as the level of sensitivity increases, the problem of unwanted background indications becomes more pronounced.

For purposes of the present invention, the term "stabilization of indication retention" refers to any of the above-mentioned methods of enhancing the retention of indications, and stabilized W/W penetrants are any of those W/W inspection penetrants in which retention of indications is enhanced by means of increased viscosity, the feature of gel-formation, or by use of special high-stability sensitizer dyes.

I have discovered that it is possible to utilize a stabilized W/W penetrant at a degree of stabilization and at a sensitivity level which would normally yield an excessive amount of background indications of shallow surface discontinuities, and by suitable modification of the washing step, the unwanted background indications may be selectively removed without loss of actual crack indications.

The principal object of the invention, therefore, is to provide a method and means of selectively removing unwanted back-ground indications in a stabilized W/W inspection penetrant process.

Figure 2:
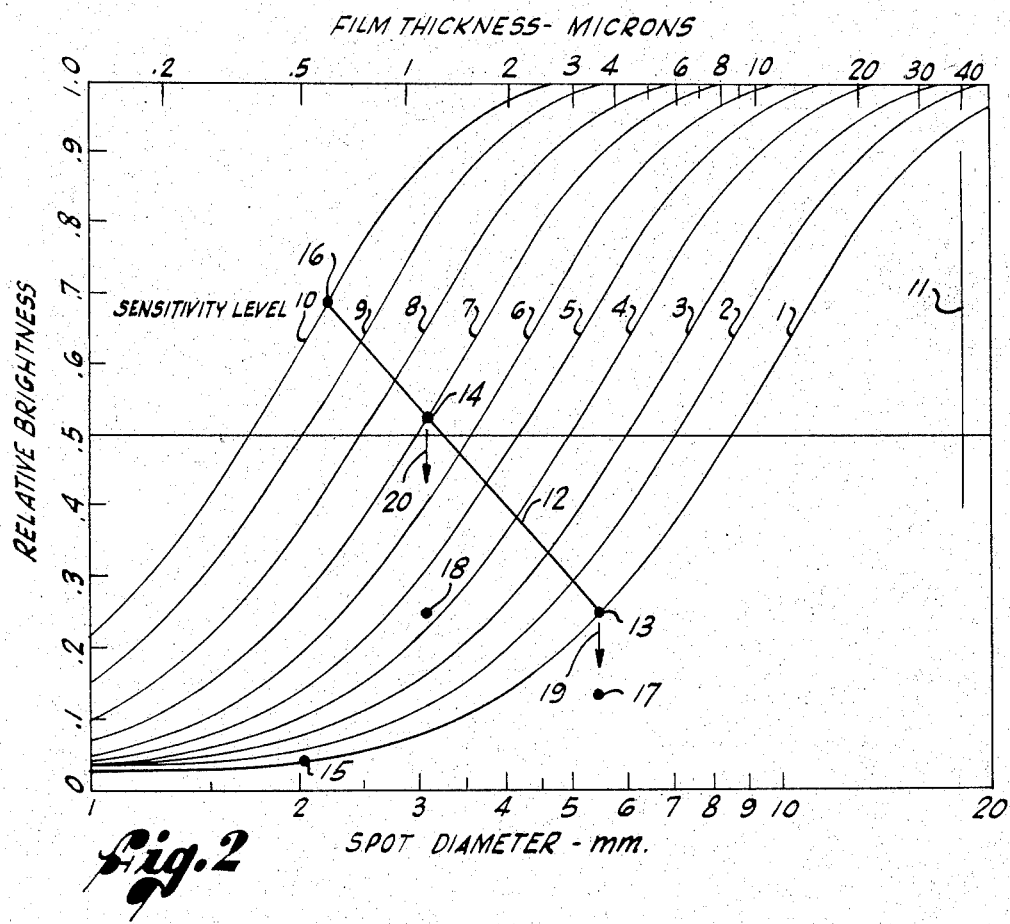

This and other objects of the invention will in part be obvious and will in part become apparent from the following description thereof when read in conjunction with the drawings in which:

FIG. 1 is a graphical illustration of a family of characteristic curves for different conditions of "indication retention" in W/W inspection penetrants, and FIG. 2 is a graphical illustration of a family of fluorescence transition curves for various W/W inspection penetrants having different levels of dimensional sensitivity.

In order to understand properly the scope and significance of the present invention, it is first necessary to discuss a technique for measuring the degradation (or retention) of indications as a function of remover contact time. A suitable method and instrumentation for this purpose is summarized as follows:

Aluminum test panels are prepared in accordance with the teachings of my U.S. Pat. NO. 3,164,006 by anodizing a sheet of type 1100.0 aluminum, 0.050 inch thick. The aluminum is anodized in a sulfuric acid bath to an anodic film thickness of 0.001 inch, and the anodic coating is heat-sealed in boiling water. The thus-anodized aluminum is cut into panels about 4 × 4 inch and the individual panels are further treated with a surface sealant in accordance with the teachings of my copending application, Ser. No. 237984, filed Mar. 24, 1972, for "Improved Cracked Test Panel for Evaluation of Inspection Penetrant Performance." The thus-prepared panels are bent over a cylindrical form having a radius of curvature of about 0.75 inch, and are then flattened out. The bending operation is conducted in two directions, at 90° to each other, whereby a mass of fine closely spaced craze cracks are produced in the center of the test panel. Alternatively, or as a supplement to the bending operation, the aluminum test panel may be heated on a hot plate to about 400° F. so as to create or further augment the craze cracking of the brittle anodic coating.

A meter suitable for measurement of fluorescent brightness response is constructed using a photomultiplier tube as the photosensor, and the phototube is arranged so as to plug into a microscope tube with a 10x objective lens. In this way, the photomultiplier tube "sees" a small area on the microscope stage about one-sixteenth inch in diameter. This area need not be in accurate focus. Stops are mounted on the microscope stage in such a way that the aluminum test panel may be placed on the stage repetitively in exactly the same position. Thus, each time the test panel is placed on the stage, the photocell sees exactly the same area of the craze-cracked panel. The photomultiplier instrument is exactly linear in its response, so that initial brightness readout conditions may be established, providing a full-scale meter reading of 100. Thereafter, subsequent readings of diminished brightness may be read out as percentages of the initial brightness value simply by noting the meter reading.

In use, the W/W penetrant being tested is applied to the crazed surface of the test panel, and excess penetrant is wiped off by means of paper towelling. The test panel is then polished with a soft tissue so as to entirely remove surface penetrant, leaving only penetrant which is actually trapped in the craze cracks. These penetrant entrapments will fluoresce and may be seen readily or read out by means of the photocell sensor, for the reason that the anodic coating on the test panel is completely transparent in character.

The thus-prepared panel is placed on the microscope stage, and the black light lamp position and multiplier voltage conditions are adjusted so as to provide a full-scale meter reading of 100. The panel is then removed from the microscope stage and is immersed in water for a pre-selected time interval which may range from a few seconds up to 10 or 15 minutes. After expiration of the period of water-contact, the panel is air-dried under a jet of compressed air, and a brightness measurement is again taken, using the standardized photomultiplier setup.

By repeating the above-described procedure, using different durations of wash-water contact, it is possible to plot curves of indication degradation as a function of wash-water contact time. In a similar manner, it is possible to plot curves of indication degradation for a P/E penetrant as a function of emulsifier contact time.

I have found that any interruption of water contact, during the water-immersion of a W/W penetrant, such that the surface film of water is replaced by air, even momentarily, may disturb the interfacial tension conditions present in the penetrant entrapments, thus making the test results unreliable. If, however, the panel is kept fully immersed in water, test measurements of indication degradation may be reproduced accurately, within a probable error of only a few percent.

Another device which is useful for evaluating penetrant performance is a metal panel which has been sandblasted to a standard degree of surface roughness. A suitable panel may be prepared from one-eighth inch thick annealed type 301, or 302, stainless steel 2 × 4 inches in size. The panel is sandblasted on one side with 100 mesh average size grit, using 60 pounds of air pressure and with the gun held approximately 18 inches from the panel at a 45° angle. The resulting surface roughness is about 65 micro-inches RMS. Similar rough surfaces, or surfaces having even greater effective roughness or porosity, may be obtained by selecting jet engine turbine blades or vanes having heat resistant-coatings (JO-coat).

Rough surfaces of the type described are useful for the evaluation of the amount of background indications which remain after washing the penetrant-treated surface with water. In simplest terms, the degree of background retention on a rough surface for a given penetrant after processing may be rated in accordance with the fluorescent brightness which is seen under standard conditions of black light irradiation. Alternatively, the brightness of the test surface may be measured as a percentage of the brightness of a standard fluorescent plaque under a given intensity of ultraviolet irradiation.

Still another measuring procedure and associated instrument which are important in connection with the present invention are the so-called "Meniscus Method" and the "Meniscus Method Apparatus," these having been disclosed and claimed in my U.S. Pat. NO. 3,107,298. The Meniscus-Method instrument consists essentially of a black glass optically polished platen and a clear glass convex lens ground to a surface radius of 106 cm. When the convex lens is placed on the flat platen, and a few drops of fluorescent dyed liquid is placed between the lens and platen, and the assembly is irradiated with ultraviolet light, then a nonfluorescent spot appears in the meniscus-shaped layer of liquid around the point of contact between lens and platen. The diameter of this spot is measured as the distance between points of half the maximum brightness of the fluorescent specimen. For the purpose of this specification, all references to "spot diameter" shall be taken to mean the distance between half-brightness points as measured by the Meniscus Method.

The feature of indication retention for various types of penetrant compositions is illustrated in FIG. 1. For the purpose of consistency in this illustration, all of the penetrant formulations tested were adjusted so as to provide the same dimensional threshold of fluorescence, as measured by the Meniscus Method, and as represented typically by a spot diameter of 3.0 mm. Similar curves are obtained when the test formulations are adjusted so as to provide different spot diameters, which, as mentioned above, may range from somewhat less than 1.5 mm. to more than 15 mm.

Referring now to FIG. 1, there is here illustrated a family of curves showing the indication retention behaviour of various penetrant compositions. In this figure, the percentage of retained indication brightness is plotted on the axis of ordinates against wash-water contact time plotted on the axis of abscissas. Curve 21 illustrates the degradation of indication brightness for a penetrant composition containing only a conventional-type sensitizer dye, and in which the penetrant liquid is a simple water-soluble solvent such as diethylene glycol.

Curve 22 shows the feature of indication degradation where the sensitizer dye is a conventional coumarin dye, and the penetrant liquid is a self-emulsifiable, but non-gel-forming composition.

Curve 23 shows the feature of indication degradation where the sensitizer dye is a conventional coumarin dye, and where the penetrant liquid is a gel-forming composition of the type disclosed and claimed in my U.S. Pat. No. 3,282,843.

Curves 24 and 25 illustrate the feature of indication degradation (or retention) for gel-forming penetrants having stabilization factors of 50 percent and 100 percent, respectively, in accordance with the teachings of my above-mentioned copending application, Ser. NO. 222,011.

I have discovered that all presently known inspection penetrant materials are characterized by flaw entrapment efficiencies which are relatively low. Actually, the flaw entrapment efficiency of a penetrant is difficult to evaluate accurately, since the geometry of a crack in the test panel is very difficult to analyze. Even though the depth of the crack may be accurately controlled, to 40 microns for example, the width of the crack is considerably smaller, being some indeterminate function of the intercrystalline separations which occur in the anodic film during the bending and cracking operation. Thus, the volume of penetrant liquid actually retained in a given crack behaves as though it has an equivalent film thickness considerably smaller than 40 microns.

Referring now to FIG. 2, there is here illustrated a family of fluorescence response transition curves, 1 to 10, representing various standard levels of penetrant sensitivity which are employed in industry. Curve 1, for example, corresponds to a level 1 penetrant which exhibits a Meniscus Method spot diameter of 8.5 mm. Curve 7 exhibits a spot diameter of 3.0 mm., and so on.

Line 11, to the right in FIG. 2, represents the depth (40 microns) of a standard crack in anodic coating as described. It is seen that the dimension of 40 microns is large with respect to the film thickness at which typical fluorescent penetrants undergo transition of fluorescence response. However, due to the fact that the volume of penetrant which may be retained as an entrapment in the crack is quite small (due to the narrow nature of the crack), the equivalent film thickness of a given entrapment is considerably less than 40 microns. I have found that equivalent film thickness values for residual entrapments of penetrant (after a specified wash-water contact time) may be expressed in terms of the relative values of residual fluorescent brightness.

Line 12 in FIG. 2 is a locus line which indicates the relative brightness levels of indications of a standard 40 micron depth crack pattern which are obtainable with fully stabilized W/W penetrants of various sensitivity levels. For example, when a level 1 fully stabilized penetrant is utilized on the 40 micron depth crack pattern, the relative brightness of the indication pattern, after one minute wash-water contact time, is about 25 percent as indicated by point 13. If the same crack pattern is tested using a level 7 fully stabilized penetrant, the relative brightness of the indications is about 53 percent, as indicated by point 14 in FIG. 2.

The features pertaining to relative indication brightness, which are illustrated in FIG. 2, are applicable to fully stabilized W/W penetrants, and the effective brightness conditions of an indication pattern is the maximum which can be obtained with fully stabilized penetrants. It will be understood that partially stabilized penetrants or nonstabilized penetrants will exhibit less effective brightness of indications, depending on the degree of stabilization which pertains.

Unfortunately, when the indication retention stability and/or sensitivity of a W/W penetrant are made sufficiently great to reveal small cracks, the penetrant also acts to yield indications of minute surface discontinuities. For example, even a low sensitivity penetrant (level 1), corresponding to curve 1 in FIG. 2, will, when utilized at a high degree of indication retention, reveal surface discontinuities as small or smaller than 0.5 micron in depth, corresponding to point 15 in FIG. 2. At this point 15, the relative brightness of such indications is about 0.04 (4 percent), and a mass of such indications can provide an objectionable background luminosity which will interfere with the visual detection of slightly larger crack defects.

I have discovered that it is possible to selectively eliminate unwanted background indications of shallow surface discontinuities in test surfaces without loss of actual crack indications. First, though, it is necessary to start with a condition of indication retention such that the desired crack indications are sufficiently stable that they remain at a reasonable level of fluorescent brightness throughout the various steps of penetrant application, wash removal of surface penetrant, and inspection.

To accomplish this end (of eliminating unwanted background indications), the wash-removal step is modified so as to introduce a step of applying an accelerator rinse to the test surface. The accelerator rinse may be any oil/water emulsifier or any water-soluble detergent which has been diluted to provide a relatively low Emulsifier Activity Quotient.

In my U.S. Pat. No. 3,422,670, I have disclosed a method and means of reducing the activity, or energy, of oil/water emulsifiers by diluting the emulsifier or detergent composition to an appropriate degree. Conventional emulsifiers or full-strength detergent mixtures usually have Activity Quotient values in excess of about 0.3. Low energy emulsifier or diluted detergent compositions suitable for use in the process of the present invention may have Activity Quotient values between about 0.0001 and 0.2.

The operation of the modified wash removal step of the invention is illustrated by the following example.

A jet engine turbine blade having a heat-resistant coating was immersed in a high-stability penetrant having the following composition:

| | |
|---|---|
| No. 2 Absorption Oil (Chevon) | 25 gal. |
| Oil-soluble Alkanolamide (Emcol 511) | 5 gal. |
| 10 mol Ethoxylated Nonylphenol | 20 gal. |
| Diethylene Glycol Monobutyl Ether | 5 gal. |
| C.I. - B.A. 68 | 7.9 lb. |
| Fluoranthene | 21 lb. |
| C.I. Solvent Yellow 43 | 2 lb. |

This formulation provides level 7 sensitivity, with gel-forming stabilization and 50 percent dye sensitizer stabilization.

The penetrant was allowed to dwell on the test part for about 5 minutes to insure complete penetration into any surface discontinuities, after which the part was washed under a pressure-spray of water (at room temperature) for a period of about 30 seconds. The part was then passed under a low pressure spray of low energy detergent mixture sufficient to completely wet the test surface. The low energy detergent (accelerator rinse) was formulated as follows:

| | |
|---|---|
| 9-mol ethoxylated nonylophenol | 8 parts |
| diethylene glycol | 2 parts |
| water | 200 parts |

In the above detergent formula, a wide variety of water-soluble detergents may be used in place of the 9-mol ethoxylated nonylphenol. Ethylene oxide mol ratios may vary from about 6 to 30, and the alkyl chain length may vary from 8 to 12 or more. Different chemical structures of the water-soluble detergent may be utilized, such as those described in my U.S. Pat. NO. 3,429,826. Also, many water-emulsifiable compositions, such as those disclosed in my U.S. Pat. Nos. 3,282,843, 3,349,041, and 3,429,826, may be employed under appropriate conditions of dilution.

The diethylene glycol employed in the above formulation is used merely as a gel-breaker, so as to facilitate dilution of the detergent in water. This ingredient may be omitted without any loss in performance of the diluted mixture. The degree of dilution may be varied from about 10 parts water (one to one) up to as much as 20,000 parts water (2,000 to 1), depending on the mode of accelerator usage.

As low dilution ratios, the accelerator rinse acts to a degree as a contact emulsifier, and the length of contact time on the accelerator rinse with the test surface must be kept quite short, such as a few seconds; otherwise, desired crack indications may be removed along with background porosity indications.

With dilution ratios of about 20 to 1 (200 parts water in the formulation), accelerator rinse contact times on the order of 10 to 30 seconds may be utilized without excessive removal of actual crack indications. When the dilution ratio is made very great, in the range of 200 to 1 or more, the activity of the accelerator rinse becomes so low that the simple contact with the rinse composition does not act to remove background indications rapidly enough for practical usage. In such cases, the action of the accelerator rinse may be made more effective by employing a continuous spray application onto test surfaces. In the example given (20 to 1 dilution ratio), the accelerator rinse may be applied by spray, brush, dip, or in any suitable manner, so long as the test surface is completely wetted by the rinse composition.

In any event, the application of the accelerator rinse onto the pre-washed test surface serves to alter the detergent chemistry of the penetrant entrapments so that entrapments in shallow discontinuities tend to wash off of the surface readily, while entrapments in deep cracks remain stable and non-washable. If it were possible to drain the test surface sufficiently, after application of the penetrant, so that an entirely uniform coating of penetrant remains on the test surface, then the pre-wash step using a spray of water could be omitted, and the accelerator rinse could be applied directly onto the penetrant-coated part. However, considerable variations occur in the thickness of the penetrant coating, and this serves to prevent uniform action of the accelerator rinse in the selective removal of background indications. For most practical purposes, it is desirable that a pre-wash be carried out prior to application of the accelerator rinse, so as to present a relatively clean test surface to the action of the accelerator rinse.

In the present example, following the application of the accelerator rinse, the test part was again rinsed briefly under a spary of water. Equivalent results are obtainable with a simple dip-rinse in water. Excess water was blown off the test part by means of compressed air, and the part was then dried and inspected under black light. It was observed that several crack indications were revealed against a background which had an extremely low level of fluorescence.

The ability of the foregoing process to reveal crack indications without substantial loss of fluorescent brightness was tested as follows: The exact same procedure as outlined above was carried out on a cracked anodic panel having surface cracks 40 microns deep. A similar process was carried out on a companion cracked anodic panel with 40 micron depth cracks, except that in this latter case, the step of application of accelerator rinse was omitted. Examination of the two cracked panels under black light showed that the crack indications produced were substantially equivalent as to brightness.

The same two processes (with and without accelerator rinse) were carried out on two rough sandblasted stainless steel panels, and examination on the washed and dried panels under black light showed that the process which included the accelerator rinse produced virtually no background indications; whereas, when the accelerator rinse was omitted, background indications of roughness were so excessive as to be unacceptable for practical inspection usage.

In the above penetrant formulation, the ratio of equivalent concentration of the C.I.- B.A. 68 and the Fluoranthene may be varied in accordance with the teachings of my copending application, Ser. No. 222,011, so as to provide a desired degree of sensitizer dye stabilization. Also, the total amount of sensitizer dye present may be varied so as to provide a desired level of dimensional sensitivity, as is well known in the art.

With regard to the C.I.- Solvent Yellow 43 constituent, it is normal practice in the formulation of inspection penetrants to utilize a color-former dye, such as a yellow fluorescent dye, for the purpose of shifting the color of fluorescence from the characteristic blue emission of the sensitizer dye to a yellow or green hue which is close to the peak of spectral sensitivity of the human eye. In some cases, it may be found desirable to employ a dye having a visible color, such as blue or red, so as to provide a dual-sensitivity feature in accordance with the teachings of my U.S. Pat. No. 3,557,015. Thus, any one of a wide variety of supplemental color-former dyes may be employed in the formulation, and the concentration of such dye or dyes is determined by the desired color result.

While the above-described modified wash-remover process employing an accelerator rinse of low energy detergent material may be utilized in connection with any W/W penetrant, I have found that distinctly beneficial and advantageous results are obtained when the penetrant is a "stabilized" or "partially stabilized" composition formulated in accordance with the teachings of my copending application, Ser. No. 222,011.

In every fluorescent inspection penetrant composition, the characteristic dimensional threshold of fluorescence response depends on the specific sensitivity of the fluorescent sensitizer dye which is employed, and its concentration. Many suitable sensitizer dyes are disclosed in my U.S. Pat. No. Re. 26,888, but for use in any oily penetrant vehicle, regardless of whether it is a P/E or W/W material, the sensitizer dye must be selected with regard to its solubility in the oily liquid vehicle. Among the better fluorescent dyes, at least with regard to solubility in oily penetrant vehicles, are various coumarin derivatives, and various heterocyclic fluorescent dyes.

A few of the suitable fluorescent dyes which may be utilized as the "nonstabilized" element of the sensitizer component of the penetrant compositions may be identified as simple 7-coumarin compounds, a few examples being:

4-methyl-7-amino-coumarin
4-methyl-7-ethylamino-coumarin
4-methyl-7-dimethylamino-coumarin
4-methyl-7-diethylamino-coumarin
4-methyl-7-(ethyl-benzylamino)-coumarin
3-benzyl-4-methyl-7-ethylamino-coumarin
3-benzyl-4,6-dimethyl-7-ethylamino-coumarin
3-benzyl-4-methyl-7-amino-coumarin
3-benzyl-4-methyl-7-dimethylamino-coumarin
3-phenyl-7-aminocoumarins In addition to the foregoing, various other coumarin deriviatives may be employed, such as those which are described in U.S. Pat. No. 2,881,186, these being 3-substituted-aminocoumarins; or those which are described in U.S. Pat. No. 2,929,822, these being 3-phenyl-7-carbalkoxy-amino-coumarin compounds, or those which are described in U.S. Pat. No. 2,945,033, these being various 7-triazinylamino-3-phenyl-coumarins. Also, certain heterocyclic compounds may be employed, similar to those which are described in U.S. Pat. No. 2,875,089, these being compounds containing azole or imidazole ring structures. A number of suitable sensitizer dyes may be drawn from the listing of Fluorescent Brightening Agents as set forth in the Color Index, published by the Society of Dyers and Colourists, Dean House, Picadilly-Bradford, Yorkshire, England. These include, in part, C.I. Fluorescent Brightening Agents Nos. 8, 9, 36, 53, 57, 58, 60, 61, 68, 69, 72, 78, and 130.

In the above listing, several of the brightening agents are coumarin-type dyes. For example, Brightening Agent No. 68 is a coumarin dye, probably 4-methyl-7-diethylamino-coumarin. This is a commonly available dye, supplied by several dye manufacturers under the designation "Color Index — Fluorescent Brightening Agent No. 68." For purposes of this specification, the above designation is abbreviated to "C.I.- B.A. 68."

Conventional ordinary dyes, typified by those listed above, all provide a non-stabilized character for indications derived from water-washable penetrants. For purposes of this specification, the degree of indication retention for such oridinary sensitizer dyes is about 25 percent for a wash water contact duration of 1 minute, and penetrants containing only such sensitizer dyes are said to have "zero" stabilization. The rating of 25 percent indication retention is, of course, a function of the crack depth in the crazed-crack test panel, and of the basic physical properties of the penetrant vehicle; viscosity, gel-forming features, etc., and this rating for the so-called non-stabilized condition may, therefore, vary somewhat from one penetrant formulation to another.

Among all of the many hundreds of fluorescent dyes which I have tested, I have discovered one type substance, and one only, which exhibits a feature of extremely high flaw indication retention. This substance is the material fluoranthene (including derivitives of fluoranthene).

The use of fluoranthene as a penetrant sensitizer has been disclosed and claimed in my U.S. Pat. Nos. Re. 26,888 and 3,527,709. However, I have made the new discovery that fluoranthene may be substituted in a controlled manner, in part, for a conventional sensitizer such as a coumarin-type sensitizer mentioned above, in such a way that the feature of indication retention is enhanced to a predictable and controllable degree. This phenomenon is observed only when the fluoranthene material is utilized in a W/W-type penetrant. The effect of enhancement of indication retention does not occur when the fluoranthene substance is substituted for a conventional sensitizer in a P/E penetrant.

I have utilized fluoranthene as a penetrant sensitizer, in the past, in connection with the formulation of P/E-type penetrants, and such usages are mentioned in my U.S. Pat. Nos. 3,311,479 and Re. 26,888. I have even tried using fluoranthene as the (sole) sensitizer dye in W/W penetrant formulations, but have found such W/W penetrant compositions to be unacceptable for commercial inspection usage. Accordingly, up to the present time, I have avoided the use of fluoranthene in W/W penetrant compositions, mainly because I have considered fluoranthene to be contra-indicated for such usage due to its almost complete insolubility in water. Now, however, I have discovered that new and novel results of controlled partial stabilization of indication retention may be achieved by combining fluoranthene with a conventional sensitizer dye in appropriate proportional amounts in W/W penetrant formulations.

For example, the use of a conventional (coumarin-type) sensitizer dye alone (with no fluoranthene), provides a dye stabilization factor of "zero." As fluoranthene is substituted for the conventional dye, the dye stabilization factor increases, being stated as the "equivalent percentage" of fluoranthene contained in the total amount of sensitizer dye which is utilized.

Equivalent percentages of fluoranthene refer to the "effective" quantities of fluoranthene, and not to the actual quantities present as might be measured on a weight basis. This is because a conventional coumarin-type dye, such as C.I.- B.A. 68 is from 2.5 to 2.8 times more effective in its specific sensitivity than is fluoranthene. Thus, for fluoranthene to be present in an "equivalent percentage" equal to the content of C.I.- B.A. 68, corresponding to a stabilization factor of 50 percent, the actual content of fluoranthene, by weight, must be about 2.5 to 2.8 times greater than the weight of the C.I.- B.A. 68. This is true regardless of the actual amount (concentration) of the C.I.- B.A. 68 which is utilized. Accordingly, the amounts of "conventional" sensitizer dye and fluoranthene which may be present in a penetrant formulation are referred to as proportional equivalent amounts, and the total amount of both conventional sensitizer dye and fluoranthene present is referred to as the total equivalent amount of fluorescent sensitizer component.

Thus, the "stabilized" element of the sensitizer component used in the preferred W/W penetrant compositions used in the process of the invention is fluoranthene or certain derivitives of fluoranthene. Fluoranthene may be represented by the empirical formula $C_{16}H_{10}$, or by the structural formula:

The simple compound, fluoranthene, may be employed, or if preferred certain fluorescent derivitives of fluoranthene may be employed, suitable substances being 3-fluoro-fluoranthene or 3-amino-fluoranthene. Nonfluorescent derivitives of fluoranthene, such as 3-nitro-fluoranthene, do not function as stabilizers for W/W penetrants. Fluoranthene, itself, is relatively inexpensive, compared with derivitives of fluoranthene, and is, therefore, the preferred material for use in the compositions of the invention.

The maximum degree of indication retention is obtained when the sensitizer component of a W/W penetrant consists entirely of fluoranthene. Under such conditions, the penetrant may be said to be 100 percent stabilized, and such penetrants, at level 7 sensitivity, provide an indication retention of about 53 percent for a wash-water contact duration of 1 minute. As in the case of conventional sensitizer dyes, some variation in the degree of indication retention may result from variations in the physical properties of the penetrant composition.

I have discovered that two mechanisms of indication depletion operate in parallel during the washing step in the W/W inspection penetrant process. The first mechanism is one in which a portion of the penetrant entrapment in a surface discontinuity is physically washed away leaving a certain volume of residual penetrant. The second mechanism is one in which the indicator dye present in the penetrant liquid is depleted by a diffusion process or a solution process, whereby it becomes leached out to a greater or lesser extent from the residual entrapment of penetrant.

Thus, the first mechanism is essentially mechanical in nature, and indication depletion by virtue of this mechanism may be minimized by employing high viscosity penetrants or gel-forming penetrants which act to resist the mechanical action of wash removal. The second mechanism is essentially physical-chemical in nature, and indication depletion by virtue of this mechanism may be minimized by employing a suitable indicator dye which is characterized by extremely low water solubility.

The first mechanism, of mechanical wash-removal of emulsified penetrant, operates in the P/E inspection penetrant process. However, the second mechanism does not, for the reason that the oily water-insoluble penetrant used in the P/E process does not permit diffusion of water and a resultant leaching action. It would appear that the conventional P/E inspection penetrant process., employing an oily water-insoluble penetrant, and emulsifier, and a water wash, could be made to provide results which are identical with those obtainable in a W/W inspection penetrant process which employs a fully stabilized (insoluble dye) penetrant and a water wash. I have found this to be true, but I have also found that the P/E process is extremely critical with respect to emulsifier energy and emulsifier contact time. If a low energy emulsifier is utilized, then indication depletion is mimimized, but background indications are produced to an excessive degree. And if a supplemental step of stripping out background indications is introduced, the P/E system becomes a four-step process, resulting in excessive costs due to added materials and labor.

Contrasted with this, a properly stabilized W/W inspection penetrant system is essentially a two-step process. And if a supplemental step of accelerator rinse is introduced, in accordance with the present invention, the W/W system becomes a three-step process which provides advantages of independent easy control over the rates of indication depletion and removal of background indications. In addition, material costs are relatively low, because of penetrants haing relatively low sensitivity, and greatly diluted detergent materials.

It will be understood, therefore, that defect indications may be formed and/or retained to a desired degree in any one of three ways. First, the washing step may be made relatively short, so as to minimize the degree of mechanical removal of penetrant entrapments. Second, the stability of the indicator dye may be adjusted to provide a desired rate of dye depletion from the residual entrapment. Third, the sensitivity level of the penetrant may be adjusted by adjusting indicator dye concentration, to a point where the combined action of mechanical wash-removal and indicator dye depletion yields residual fluorescence response of a desired magnitude.

I have found that if it is desired to reveal crack defects which are about 40 microns deep, a fully stabilized gel-forming W/W penetrant will provide indications of such cracks to a relative brightness response of from about 25 percent to about 70 percent (of initial brightness), depending on the dimensional sensitivity of the penetrant, as can be seen by points 13 and 16 in FIG. 2. Likewise, a nonstabilized penetrant having level 7 sensitivity, as illustrated by the transition curve 7 in FIG. 2, would provide indications of 40-micron-depth cracks to a relative brightness response of about 25 percent, as indicated by point 18 in FIG. 2, and a nonstabilized penetrant having level 1 sensitivity would provide a relative brightness for such indications of about 12 percent, as indicated by point 17 in FIG. 2. Arrows 19 and 20 illustrate how indications 13 and 14 are degraded from a "stabilized" condition to diminished brightness values represented by points 17 and 18, respectively, when nonstabilized-format penetrants are employed instead of stabilized-format penetrants.

Accordingly, the term "stabilized penetrant" as used herein refers to a W/W inspection penetrant which is capable of yielding indications of 40 micron deep cracks, after 1 minute contact with wash water, to a relative brightness greater than about 12 percent. In any event, whether a high degree of flaw detection sensitivity is derived from a high level of dimensional sensitivity or from a high degree of indication retention efficiency, the ability of a stabilized penetrant to display residual indications from 40-micron-depth cracks to a relative brightness greater than about 12 percent also results in an ability to yield background porosity indications to an objectionable degree.

The process of the invention, in which the wash step is modified by the introduction of an accelerator rinse step, may be employed with any water-washable inspection penetrant, but is utilized to best advantage in connection with stabilized penetrants as identified above.

It will be understood that the process of the invention provides advantages of accurate control of the amount of residual background indications of fine surface porosity, a minimum number of processing steps, and economy in mateials used by virtue of the fact that low-cost, low-sensitivity penetrants are operated at high levels of flaw entrapment efficiency and low-cost highly diluted low-energy accelerator rinse solutions are employed.

It will be understood that the accelerator rinse composition of the invention may be utilized at a wide range of dilution ratios, depending in part on the strength or activity of the detergent material or the emulsifier which is employed. In the case of the 9-mol ethoxylated nonylphenol material of the example given (supra), a preferred range of concentrations is from about 10 to 1 to about 100 to 1.

Although the invention has been described with respect to specific embodiments thereof, it will be understood that various changes and modifications may be made without departing from the spirit and scope of the appended claims.

I claim:

1. A water-washable inspection penetrant process for detecting surface flaws in test parts comprising essential steps as follows; (1) applying a water-washable fluorescent penetrant composition to a test surface, (2) washing off surface penetrant with water, leaving entrapments of fluorescent penetrant in flaws open to the surface, (3) applying a low-energy accelerator rinse solution to said test surface for a controlled period of time ranging from about 10 seconds up to about 10 minutes, and (4) inspecting said test surface under black light for the presence of said entrapments of penetrant, said low-energy accelerator rinse having an activity quotient falling within the range of about 0.0001 to 0.2.

2. A process in accordance with claim 1, in which said low-energy accelerator rinse consists essentially of 9-mol ethoxylated nonylphenol diluted with about one part to 2,000 parts water.

3. A process in accordance with claim 1, in which said low-energy accelerator rinse consists essentially of 9-mol ethoxylated nonylphenol diluted with about 20 parts water.

* * * * *